April 15, 1958  A. MUSSCHOOT  2,830,696
OSCILLATING CONVEYORS
Filed April 27, 1955  5 Sheets-Sheet 1

April 15, 1958  A. MUSSCHOOT  2,830,696
OSCILLATING CONVEYORS
Filed April 27, 1955  5 Sheets-Sheet 2

April 15, 1958  A. MUSSCHOOT  2,830,696
OSCILLATING CONVEYORS

Filed April 27, 1955  5 Sheets-Sheet 3

April 15, 1958

A. MUSSCHOOT 2,830,696

OSCILLATING CONVEYORS

Filed April 27, 1955

United States Patent Office 2,830,696
Patented Apr. 15, 1958

2,830,696

OSCILLATING CONVEYORS

Albert Musschoot, Park Ridge, Ill., assignor to Link-Belt Company, a corporation of Illinois Application April 27, 1955, Serial No. 504,171

14 Claims. (Cl. 198—220)

This invention relates to new and useful improvements in apparatus for balancing and absorbing the inertia forces developed by oscillating equipment and deals more particularly with apparatus of the above mentioned type that is specially adapted for use with positively driven oscillating conveyors.

In recent years, there has been a widespread use of oscillating conveyors for moving free flowing solids. Generally, such conveyors are driven by a mechanism which imparts positive and uniform oscillations to the bodies of the conveyors for advancing the material thereon. Further, the supporting structure of each conveyor has usually been provided with spring reactor elements so designed that the spring forces generated and applied to the oscillating body of the conveyor at each end of each oscillation approximately equal the inertia forces of the oscillating masses of the conveyor body and the material supported thereon. The conveyor is thereby oscillated at the resonant frequency of its spring-mass system so that the thrust requirements of the drive mechanism during operation of the conveyor are reduced to a minimum. It is also possible by the distribution of the spring reactor elements along the base of the conveyor to reduce the reactive forces applied at any one point to the foundation upon which the conveyor rests.

Since the resonant frequency operation of the above described type of conveyor is dependent upon the provision of reactor elements capable of exerting forces the sum of which is equal to the inertia forces of the oscillating masses, any increase in the capacity of such conveyors has been accompanied by an increase in the inertia forces and has required the use of a greater number of, or more powerful, reactor elements. The capacity of such conveyors, therefore, has been limited by the number and strength of the reactor elements which could be designed into a practical conveyor structure and by the high starting loads applied to the drive mechanism as a result of the increased forces of the reactor elements. In connection with the latter limitation, it will be noted that the mass of the conveyor body and the material thereon will move very slowly during the starting cycles of the conveyor so that there will be practically no inertia forces developed to be balanced by the reactor forces until the conveyor is brought up to speed. The starting load imposed on the drive mechanism by the reactor elements, therefore, has been as much as five times greater during the starting of the conveyor than during the normal running load.

A further consideration in the designing of high capacity conveyors of the above discussed type has been the increase in the forces applied to the base by the reactor elements. Despite the distribution of these forces along the conveyor base, the forces become sufficiently large in higher capacity conveyors to create problems in the provision of satisfactory foundations and supports for the conveyors.

It is the primary object of this invention to provide apparatus for developing reactor forces and applying the reactor forces to an oscillating body in response to the development of opposed inertia forces by the oscillation of the body.

A further important object of the invention is to provide apparatus for applying reactor forces to an oscillating body to oppose and balance the inertia forces developed by the body, the reactive forces developed by said apparatus being substantially isolated from the base upon which the oscillating body is supported.

Another important object of the invention is to provide apparatus for opposing and balancing the inertia forces developed by a positively driven oscillating body by applying reactive forces to the body after the latter has been placed in operation and the frequency of oscillation thereof has increased to a given value.

Still another important object of the invention is to provide apparatus for applying reactive forces to a positively driven oscillating conveyor which apparatus has a negligible effect on the starting load of the drive for oscillating the conveyor.

A further object of the invention is to provide apparatus that is actuated by oscillation of an associated body for developing inertia forces which are opposed to and will balance the inertia forces developed by the oscillating body and which are substantially isolated from the base upon which the body is mounted to prevent the transmission of excessive forces to the base.

A still further object of the invention is to provide apparatus for opposing and balancing the inertia forces developed by a positively driven oscillating conveyor in such a manner that initial movements of the conveyor from a position at rest are substantially unopposed by the apparatus and a minimum starting load will be imposed on the drive for oscillating the conveyor.

Other objects and advantages of the invention will be apparent during the course of the following description.

In the accompanying drawings forming a part of this specification, and in which like reference characters are employed to designate like parts throughout the same.

Figures 1, 2:
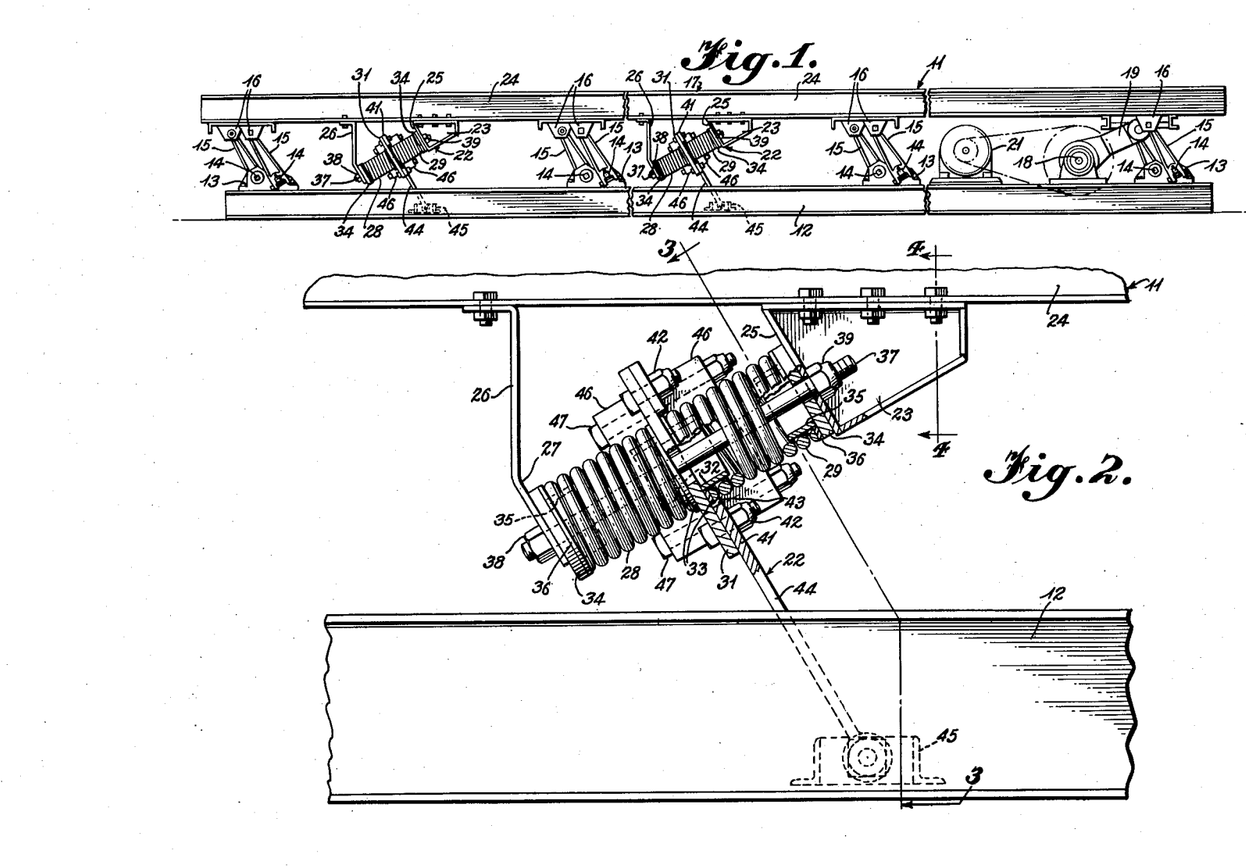
Figure 1 is a side elevational view, partly broken away, of an oscillating conveyor embodying the invention.
Figure 2 is a partly side elevational and partly vertical sectional view of the reactor unit employed in the conveyor of Fig. 1.

In the drawings, wherein for the purpose of illustration are shown the preferred embodiments of the invention, and first particularly referring to Fig. 1, there is shown an oscillating conveyor designated in its entirety by the reference character 11. A pair of laterally spaced I-beams 12 provide a base for the conveyor 11 and have mounted at spaced points along their lengths trough supporting assemblies of the type disclosed in United States Patent No. 2,588,018, issued to Carl F. Lauenstein on March 4, 1952. Each supporting assembly includes a pair of laterally opposed torsion bar mounts 13 and a pair of associated torsion bars 14. Each torsion bar 14 has one end portion clamped to the mount 13 at one side of the conveyor 11 with the opposite end portion extending laterally through and pivotally carried by the mount 13 at the opposite side of the conveyor. The torsion bars 14 of each supporting assembly are so arranged that their pivotal end portions lie on opposite sides of the conveyor 11. Connected to and extending angularly upwardly from the pivotal end portions of the torsion bars 14 at opposite sides of the conveyor 11 are the support arms 15 which are pivotally connected to the brackets 16 attached to the bottom of the conveyor trough 17.

The above described supporting assemblies also incorporate rotatable clamping members by means of which the stationary end portions of the torsion bars 14 may be angularly adjusted to balance the gravity components of the forces acting on the trough 17 and material therein. In other words, the weight of the trough 17 and the material therein is balanced by the torsional forces applied to the supporting arms 15 by the torsion bars 14 when the conveyor 11 is in a static or non-operating position. Further, oscillation of the trough 17 will cause the torsion bars 14 to be twisted and to apply limited reactive forces in a direction tending to balance the inertia forces developed by the trough and the material therein. These reactive forces developed by the torsion bars 14, however, may be maintained at a minimum value by provision of additional reactor units as will be later described.

Pivotally connected to the bottom of the conveyor trough 17 and rotatably mounted on the eccentric middle portion of the drive shaft 18 is a drive arm 19 of the type which is fully illustrated and described in United States Patent No. 2,644,344 issued on July 7, 1953, to Albert Musschoot, Richard F. Bergmann and Charles M. Young, Jr. The shaft 18 is driven by a motor 21 to cause the drive arm 19 to impart oscillatory movements to the conveyor trough 17.

Figure 3:
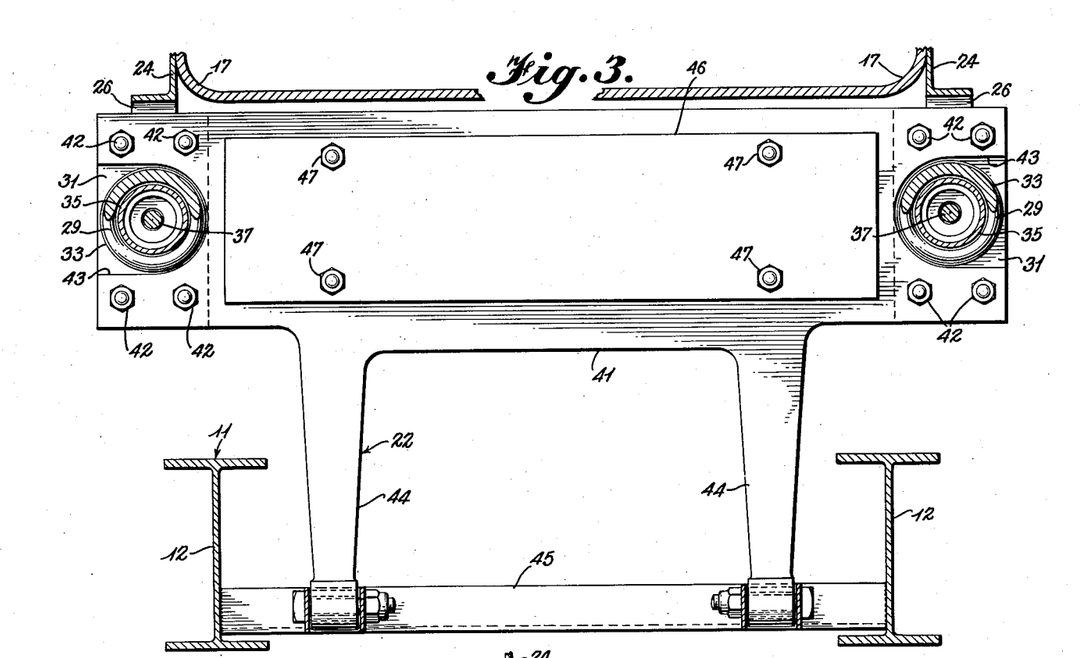
Figure 3 is a transverse sectional view taken on line 3—3 of Fig. 2.
Figure 4:
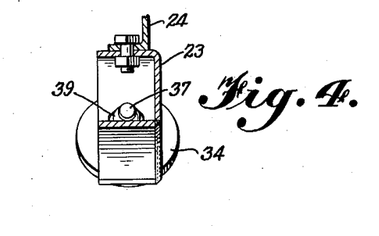
Figure 4 is a fragmentary sectional view taken on line 4—4 of Fig. 2, Figures 5a and 5b are side elevational views of an oscillating conveyor employing a modified form of reactor unit embodying the invention.

At one or more points along the length of the conveyor 11, a balancer or reactor unit, designated in its entirety by the reference character 22, is provided for the conveyor. Referring now to Figs. 2, 3 and 4 for a detail description of the reactor unit 22, it will be noted that two brackets 23 are mounted in laterally opposed relationship on the bottoms of the channel beams 24 at the opposite sides of the conveyor trough 17. Each bracket 23 is provided with a seating surface 25 that is arranged at an obtuse angle to the vertical and is in substantially parallel relationship with the longitudinal centerline of each supporting arm 15 when the conveyor is at rest. Mounted on the bottoms of the channel beams 24 in longitudinally spaced relationship with the brackets 23 are the brackets 26, each of which provides a seating surface 27 in parallel relationship with the seating surface 25 of the associated bracket 23 at the corresponding side of the conveyor 11.

Arranged between each pair of opposed seating surfaces 25 and 27 are two coil springs 28 and 29 having their axes aligned and in normal relationship with the seating surfaces. The inner, adjacent ends of the springs 28 and 29 have positioned therebetween a rectangular plate 31 having annular spring guides 32 extending from its opposite faces within the end coils of the springs. The washers 33 are fitted over the guides 32 on opposite sides of the plate 31 and lie between the plate and the adjacent ends of the associated springs 28 and 29. At their outer end portions, the springs 28 and 29 are provided with end caps 34 which bear against the seating surfaces 27 and 25, respectively, and are provided with annular spring guides 35 arranged within the end coils of their associated springs. Washers 36 are positioned between the outer ends of the springs 28 and 29 and their associated caps 34. Extending axially through the springs 28 and 29 and through aligned openings in the plate 31, caps 34 and brackets 23 and 26 is a retaining rod 37 which is threaded at its opposite end portions for receiving nuts 38 and 39 by means of which the springs may be compressed between the brackets and will be retained in the above described positions.

As best illustrated in Fig. 3, a weight supporting plate 41 extends laterally between and is fastened to the plates 31 at opposite sides of the conveyor 11 by bolts 42 to provide a resilient coupling between the plate 41 and the brackets 23 and 26 which are carried by the trough 17. The plate 41 is provided with laterally opening notches 43 at its end portions to provide clearance for the springs 29 and is provided with transversely spaced arms 44 which extend angularly downwardly in parallel relationship with the seating surfaces 25 and 27 when the conveyor is at rest. The arms 44 are pivotally connected at their lower end portions to a bracket 45 which extends transversely between the I-beams 12 of the conveyor base. Weights 46 are mounted on opposite sides of the weight supporting plate 41 by bolts 47.

It will be readily apparent that each conveyor installation will require independent consideration, according to its size and the weight of the material to be handled, for the proper determination of the number and total reactive capacity of the reactor units 22 to be employed. The following illustration, therefore, is given as an example of one method of designing a typical conveyor and is not to be considered as restricting the scope of applicant's invention.

Assuming that a given conveyor installation employs a trough that is to be oscillated at a frequency of 350 oscillations per minute through a stroke of 1¼ inches and that the weight of the trough and the capacity of the conveyor are such that the total weight of the trough and the material thereon will remain at a substantially constant value of 2200 pounds, the inertia force developed by the mass of the trough and material at each end of each oscillation can be calculated with sufficient accuracy by using the equation for simple harmonic motion. The inertia force, therefore, is:

$$F = M_c N^2 d \qquad (1)$$

where $M_c$ = the weight of the trough and material in pounds divided by the acceleration due to gravity which is given a value of 32.16 feet per second.

$N$ = the operating frequency in radians per second or the number of oscillations per minute divided by 60 and multiplied by 2×3.1416 (pi).

$d$ = the distance of the mass from the center of its stroke in feet or ½ the stroke in inches divided by 12.

Then $$F = \frac{2200}{32.16} \times \frac{350 \times 2 \times 3.1416}{60} \times \frac{1.25}{2 \times 12} = 4770 \text{ pounds}$$

The inertia force of 4770 pounds must be balanced by the sum of the reactor forces applied to the trough by the torsion bars and the reactor units. Considerable latitude is available in the selection of the number of reactor units to be used and the amount of reactor force to be supplied by the torsion bars. In this installation, for example, one 4800 pound reactor unit, two 2400 pound reactor units or a greater number of smaller units can be used to supply the necessary reactor forces with the torsion bars being used solely to balance the static weight of the trough and material. On the other hand, two reactor units having a standardized capacity of 2000 pounds may be used, the remaining 770 pounds of reactor force being supplied by the torsion bars. The 770 pound force of the torsion bars is sufficiently low to prevent undue stress on the drive mechanism during starting of the conveyor so that the use of two 2000 pound reactor units will provide a satisfactory design for the conveyor. The following calculations, therefore, are of general application but specifically illustrate the design of a 2000 pound reactor unit.

As a preliminary factor in the determination of the design for a reactor unit, a natural vibrating frequency for the spring-mass system of the reactor unit should be selected, bearing in mind that the operating frequency of the conveyor should exceed the natural frequency of the reactor unit by an amount which is sufficient to cause the conveyor and the reactor mass to vibrate with a phase difference which approaches 180° or pi radians. It should also be noted that the stroke of the reactor mass bears a direct relationship to the ratio of the square of the natural frequency to the square of the operating frequency as will be later described. Further, care should be taken to provide a sufficient difference between operating and natural frequencies to positively prevent operation of the conveyor in resonance with the reactor in which event the reactor mass would vibrate excessively and in phase with the conveyor.

Experiments have shown that good results will be obtained and resonance between the conveyor and the reactor unit will be avoided if the natural frequency selected for the reactor unit does not exceed about ⅔ the operating frequency of the conveyor. Assuming then that a ratio of natural frequency to operating frequency of ⅔ has been selected, the length of the stroke of the vibrating mass of the reactor unit may be calculated as follows:

From the equation for the frequency of vibrating systems, $$N_n^2 = \frac{k}{M_u} \quad (2)$$

or $$N_n^2 M_u = k$$

where $N_n$ = the natural frequency of a vibrating mass in radians per second.

$M_u$ = the mass of the vibrating portion of the reactor unit.

$k$ = the spring constant or the force necessary to produce a deflection of the spring equal to unity. Since the conveyor and reactor mass will be operating with a phase difference of approximately 180°, the spring constant may be taken as being equal to the force exerted by the reactor at the end of its stroke divided by the total deflection of the spring which is the sum of the displacements of the conveyor and the reactor mass from the mid-points of their oscillations. In other words, $$k = \frac{F_a}{d+r} \quad (3)$$

where $F_a$ = the reactor force at the ends of each oscillation.
$d$ = ½ the total stroke of the conveyor.
$r$ = ½ the total stroke of the reactor mass.

Substituting this value of $k$ into Formula 2 and multiplying both sides of the equation by $r$ gives:

$$M_u r N_n^2 = r \frac{F_a}{d+r} \quad (4)$$

The inertia developed by the reactor mass, however, must supply a reactor force equal to $F_a$ when the reactor mass is vibrated with a maximum displacement equal to $r$ at the operating frequency N. Therefore, from the equation for simple harmonic motion, $$M_u N^2 = \frac{F_a}{r}$$

or $$M_u r = \frac{F_a}{N^2} \quad (5)$$

Substituting into Formula 5, $$\frac{F_a}{N^2} \times N_n^2 = r \frac{F_a}{d+r}$$

$$\frac{N_n^2}{N^2} = \frac{r}{d+r} \quad (6)$$

Substituting R for the ratio $$\frac{N_n}{N}$$

$$R^2 = \frac{r}{d+r}$$

$$dR^2 + rR^2 = r$$

$$dR^2 = r - rR^2 = (1-R^2)r$$

$$r = \frac{dR^2}{1-R^2} \quad (7)$$

For the conveyor under consideration, $R = ⅔$ and $d = .625$ so $$r = .625 \times \frac{4}{9} \times \frac{9}{5} = .500 \text{ inch or } \frac{.5}{12} \text{ ft.}$$

Since $$k = \frac{F_a}{d+r}$$

$$k = \frac{2000}{.625 + .5} = 1780 \text{ lbs./inch}$$

And $$N_n = ⅔N = \frac{2 \times 350 \times 2 \times 3.1416}{3 \times 60}$$

$$N_n = 24.4 \text{ radians/second}$$

Since $$M_u N^2 = \frac{F_a}{r}$$

$$M_u = \frac{F_a}{N^2 r} = \frac{2000 \times 12}{(36.6)^2 \times .5} = 35.9$$

But $$M_u = \frac{W}{32.16}$$

Where $W$ = the weight of the vibrating portion of the reactor unit in pounds.

Therefore, $$W = 32.16 \times 35.9 = 1153 \text{ pounds}$$

Since the total spring constant of the reactor unit is 1780 pounds per inch, as calculated above, and four springs are employed in the unit, the spring constant of each spring should be 445 pounds per inch. For simplicity of design, however, springs having a constant of 450 pounds per inch may be used. It will also be noted that the total weight of 1153 pounds includes both the weights and the weight supporting structure.

Other mathematical procedures may be followed in designing reactor units embodying the invention, bearing in mind that the mass of the reactor must develop the required inertia force when oscillated at the operating frequency of the conveyor and that natural frequency of the spring-mass system of the reactor unit must bear a certain selected relationship with the operating frequency of the conveyor.

The operation of the reactor units 22 will be described in detail as follows:

Considering that the conveyor 11 is in a position of rest, it will be recalled that the static weight of the conveyor trough 17 and the material supported therein is balanced by the forces exerted on the supporting arms 15 by the torsion bars 14. The gravity components of the forces developed by the trough 17 and the material thereon, therefore, may be omitted from the following discussion of the forces developed by the trough and material during starting and normal operation of the conveyor. Obviously, there will be no inertia forces developed by the trough 17 and material until the conveyor 11 is set into operation.

When the motor 21 is energized, the drive shaft 18 causes the drive arm 19 to impart oscillatory movements to the trough 17 and its contents. During the starting period, however, the speed of rotation of the drive shaft 18 must be accelerated from zero to its normal operating speed. Also during the starting period, the frequency of the oscillatory movements of the trough 17 and its contents will increase from zero to the normal operating frequency and, it will be readily apparent, the inertia forces developed by the trough and its contents will similarly increase from zero to a maximum operating value.

When the motor 21 is energized and during the initial portion of the starting period, the weights 46, plate 41, arms 44, and plates 31 of each reactor unit 22, hereafter referred to as the mass of the reactor unit, will move with the conveyor trough 17 and its contents and the small inertia forces developed by the trough and its contents will be balanced by the reactor forces supplied by the torsion bars 14. As the frequency of oscillation of the trough 17 and its contents increases, however, the mass of each reactor unit will begin to oscillate in out-of-phase relationship with the conveyor trough and when the conveyor trough is oscillating at its normal operating frequency the phase difference is substantially 180°. In other words, at the normal operating frequency, the trough 17 and the masses of the reactor units 22 will oscillate simultaneously in opposite directions. This phase relationship at the normal operating frequency of the conveyor 11 results from the selection of weights 46 and springs 28 and 29 which will provide a spring-mass system the natural frequency of which is below the normal operating frequency of the conveyor.

Since the spring-mass system of each reactor unit 22 is designed to provide a natural frequency below the operating frequency of the conveyor, the amplitude of the oscillations of the masses of the reactor units will be smaller than the amplitude of the oscillations of the conveyor trough 17.

When the conveyor trough 17 is oscillating at its normal operating frequency and the masses of the reactor units 22 are oscillating with a phase difference of 180° from that of the trough, the inertia forces developed by the trough and its contents at each end of each oscillation thereof are opposed to a limited extent by the torsion bars 14 but are principally opposed by the inertia forces developed by the masses of the reactor units acting alternately through the springs 28 and 29 at the opposite end points of the oscillations of the trough. In other words, the inertia forces developed by the masses of the reactor units 22 function as reactor forces in balancing the inertia forces of the trough 17 and its contents. The drive arm 19, therefore, is not required to overcome the momentum of the trough 17 as its direction of movement is reversed at each end point of each oscillation.

Because the mass of each reactor unit 22 moves in a direction which is substantially normal to the axis from its pivot point to the center of gravity of the mass, transmission of the inertia forces absorbed by the springs 28 and 29 to the I-beams 12 at the base of the conveyor is substantially eliminated. The inertia forces of the trough 17 and its contents are absorbed by the springs 28 and 29 when they are alternately compressed between the oscillating masses of the reactor units 22 and the associated brackets 26 and 23, respectively, which are attached to the trough.

As a result of the ability of the mass of each reactor unit 22 to move with the trough 17 during the initial portion of the starting period for the conveyor 11, the starting load imposed on the motor 21 is maintained at a minimum value. In other words, when the conveyor 11 is first set into operation, the inertia forces developed thereby are small and only small reactive forces are necessary to overcome or balance the inertia forces. As the frequency of oscillation of the conveyor 11 is increased to its normal operating frequency, large inertia forces are developed which are opposed and balanced by the reactive forces simultaneously developed by the reactor units 22. The conveyor 11, therefore, is normally operated at its resonant frequency at which the inertia forces are balanced so that the running load on the motor 21 and drive arm 19 will be held to a minimum value.

Figure 5A:
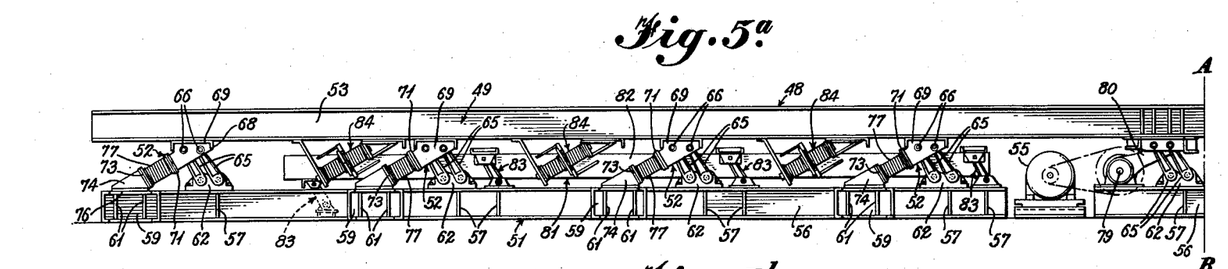
Figure 5B:
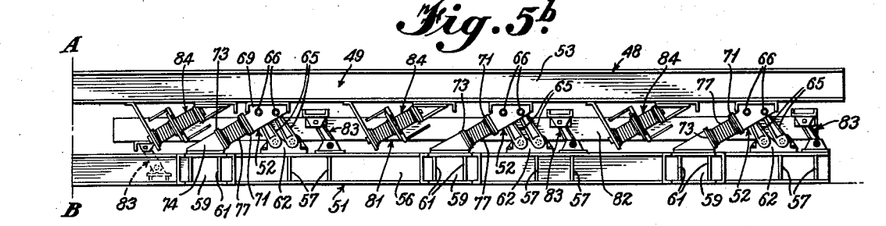
Figures 7, 8, 9:
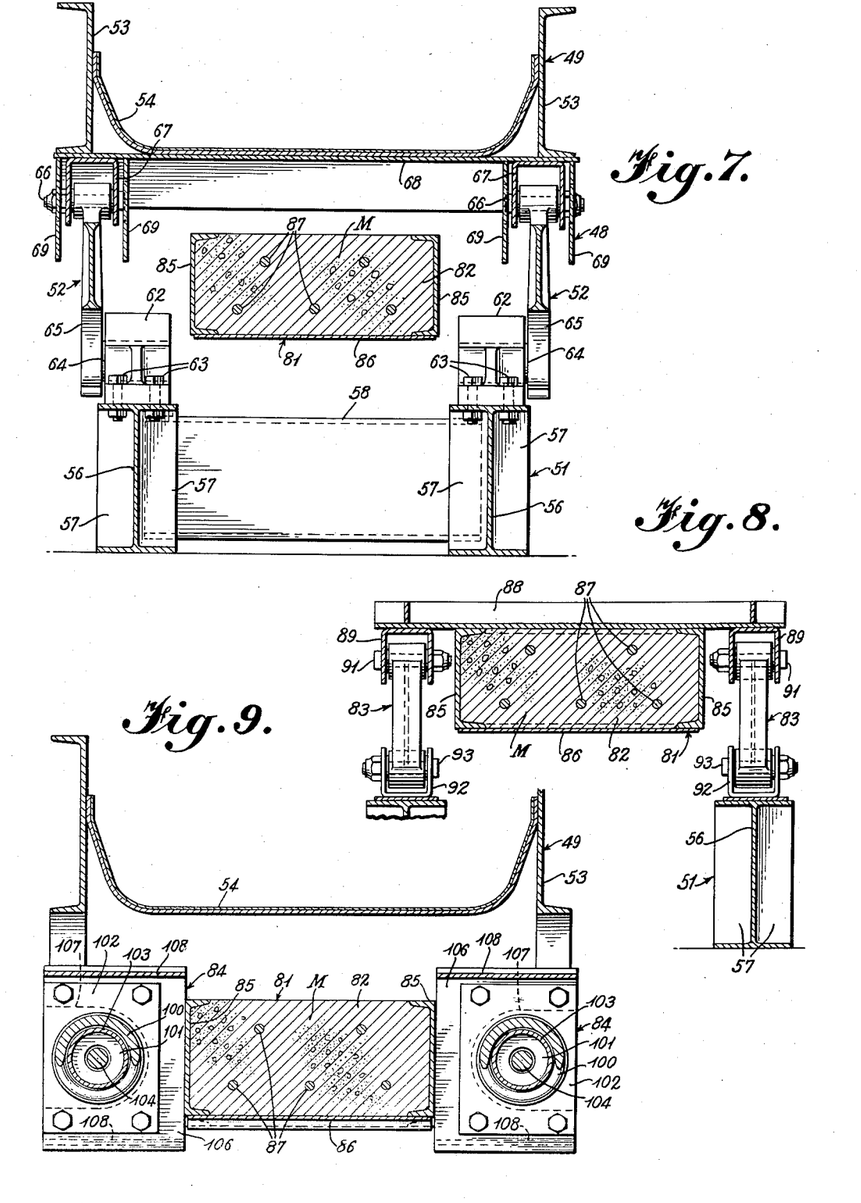
Figure 7 is a transverse sectional view taken on line 7—7 of Fig. 6.
Figure 8 is a transverse sectional view taken on line 8—8 of Fig. 6.
Figure 9 is a transverse sectional view taken on line 9—9 of Fig. 6.

Referring now to Figs. 5a and 5b for a detail description of the modification of the invention illustrated therein, reference character 48 designates an oscillating conveyor in its entirety, which includes a trough 49 that is supported on a base 51 by a plurality of longitudinally spaced support assemblies 52. As is best illustrated in Figs. 7 and 9, the trough 49 is formed of laterally spaced channel members 53 arranged in back-to-back relationship and having positioned therebetween and connected thereto a pan 54 which supports the material for movement along the conveyor.

Figure 6:
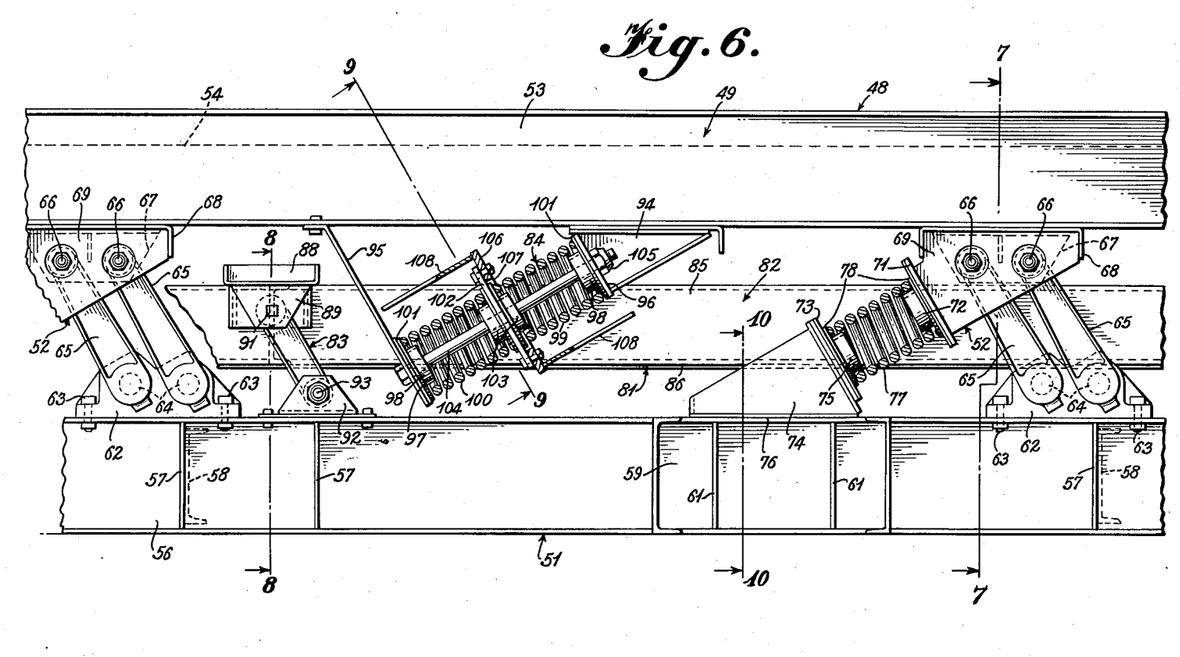
Figure 6 is an enlarged, fragmentary, partly side elevational and partly vertical sectional view of the reactor unit and conveyor supports employed in the conveyor of Figs. 5a and 5b.
Figure 10:
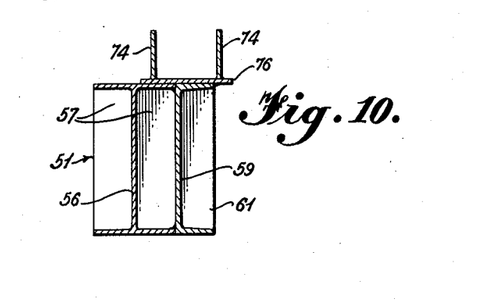
Figure 10 is a transverse sectional view taken on line 10—10 of Fig. 6.

The base 51 is formed of two elongated sections, the adjacent end portions of which are separated at approximately the mid-point of the conveyor and a drive motor 55 is positioned between the two sections of the base and beneath the trough 53. Each section of the base 51 includes a pair of laterally spaced, longitudinally extending I-beams 56. Stiffening webs 57 are positioned between and connected to the flanges of each beam 56 at spaced points along the latter. Transversely arranged channel members 58 extend between and are connected to longitudinally spaced pairs of laterally opposed stiffening webs 57 on the inner sides of the beams 56. At spaced points along each section of the base 51, the width of the base is increased by the provision of channel members 59 which are arranged in laterally aligned pairs and connected to the outer side edges of the flanges of the beams 56. As illustrated in Figs. 6 and 10, the end portions of the channel members 59 are oppositely beveled and stiffening webs 61 are fitted into the outwardly opening channels of the members and connected thereto.

Mounted on the base 51 at longitudinally spaced points along the conveyor 48 are a plurality of oppositely arranged pairs of support assemblies 52. As best illustrated in Figs. 6 and 7, each support assembly 52 is provided with a mount 62 that is positioned on the top surface of the beam 56 and connected thereto by bolts 63, or the like. The mount 62 is formed with two longitudinally spaced, transversely extending bores into which are fitted bushings, not shown, for receiving the cylindrical hubs 64 of the supporting arms 65. The arms 65, therefore, are pivotally movable about the axes of their hubs 64. The upper end portion of each arm 65 is provided with a pin 66 which extends transversely through a bushed opening in the arm and through aligned openings in the bracket 67 to pivotally connect the arm and bracket. The bracket 67 is carried by the inverted channel member 68 which extends transversely across the bottom side of the trough 49 and is connected to the bottoms of the channel members 53 and pan 54.

Mounted on the channel members 68 adjacent opposite sides of each bracket 67 are a pair of side plates 69, corresponding inclined edges of which have connected thereto a plate 71 arranged to provide a spring base in parallel relationship with the axes of the arms 65. Mounted on the plate 71 is an annular spring guide 72. A second plate 73 is mounted on spaced side plates 74 to provide a spring seat in opposed parallel relationship with the spring seat provided by each plate 71. Each plate 73 is provided with an annular spring guide 75 in axial alignment with the opposed spring guide 72. The side plates 74 are connected to a base plate 76 which rests upon and is connected to the top of one of the channel members 59 and the adjacent portion of its associated I-beam 56. A coil spring 77 is positioned between the plates 71 and 73 with the coils at its opposite end portions seated against washers 78 in surrounding relationship with the spring guides 72 and 75.

Mounted on the base 51 adjacent the drive motor 55 is a drive shaft 79 which extends transversely of the base and is provided with an eccentric middle portion, not shown. A drive arm 80 has one of its end portions rotatably mounted on the eccentric middle portion of the shaft 79 and its other end portion pivotally connected to the bottom side of the trough 49 so that rotation of the shaft will cause its eccentric middle portion to impart reciprocatory movements to the drive arm and will cause the trough 49 to be oscillated on its support assemblies 52. It will be noted at this point that the reciprocatory motion imparted to the drive arm 80 and the resulting oscillations imparted to the trough 49 are sufficiently limited by the eccentricity of the shaft 79 that the springs 77 of the support assemblies 52 will remain at all times under compression. The extent to which the springs 77 are compressed, however, will be varied by the oscillatory movements of the trough 49.

At the point at which the drive arm 80 is connected to the bottom of the conveyor trough 49, the conveyor 48 is provided with a pair of supporting arms 65 and a housing 62 at each side of the conveyor. The arms 65 and housing 62 are identical to those of the support assemblies 52 and will not be described in detail.

That portion of the conveyor 48 on each side of the drive motor 55 has associated therewith a reactor unit designated in its entirety by the reference character 81. The two reactor units 81 are of identical construction with each unit including a weight 82, a plurality of supporting arms 83 and a plurality of reactor spring assemblies 84. As illustrated in Figs. 7, 8 and 9, each weight 82 is formed of a pair of spaced, inwardly opening channel members 85 having a bottom plate 86 connected to and extending between their bottom flanges to form an elongated box having an open top. The box formed by the channel members 85 and the bottom plate 86 is filled with concrete or other similar material M which is reinforced by the longitudinally extending rods 87.

Channel members 88 extend transversely across the weight 85 at longitudinally spaced points along the length of the latter and project laterally from the sides of the plate for receiving the depending brackets 89 to which the upper end portions of the support arms 83 are pivotally connected as illustrated in Fig. 8. The upper end portions of the arms 83 are positioned between the spaced depending portions of the brackets 89 and are connected thereto by pins 91 which extend through the spaced portions of the brackets and through bushed openings in the upper end portions of the arms. The lower end portions of the arms 83 are connected to the base 51 by similar brackets 92 and pins 93 so that the weight 82 is free to oscillate in parallel relationship with the conveyor trough 49.

Each reactor spring assembly 84 includes a pair of longitudinally spaced brackets 94 and 95 providing spring seats 96 and 97, respectively, which are arranged in parallel relationship with the longitudinal axes of the arms 83 and 65 when the conveyor is at rest. Each of the spring seats 96 and 97 is provided with an annular spring guide 98. A pair of coil springs 99 and 100 are seated against washers 101 on the seats 96 and 97, respectively, with the coils at their seated end portions in surrounding relationship with the spring guides 98. The springs 99 and 100 have positioned between their adjacent end portions a plate 102 having oppositely directed annular spring guides 103 extending into the adjacent coils of the springs. The spring seats 96 and 97 and the plate 102 are provided with openings which are aligned axially of the springs 99 and 100 for receiving the bolt 104 which has threaded on its upper end portion a nut 105 which can be tightened or loosened to adjust the compression in the springs.

Mounted on and extending laterally outwardly from the opposite sides of the weight 82 at each reactor spring assembly 84 is a plate 106 provided with an outwardly opening notch 107 for receiving the spring 99 to permit the plate 102 to be bolted to the plate 106. The weight 82 is thereby coupled to the trough 49 through the springs 99 and 100. Reinforcing struts 108 are arranged in normal relationship with the plate 106 and the side of the weight 82 to rigidly support the plate on the side of the weight. When the plates 102 and 106 are coupled together as described above and the conveyor 48 is at rest, the arms 65 and 83 are maintained in substantially parallel relationship by the reactor spring assemblies 84. It will be readily apparent that relative movement between the weight 82 and the conveyor trough 49 will cause either the springs 99 or the springs 100 of the reactor spring assemblies 84 to be compressed.

Referring now to Figs. 5a and 5b for a detail description of the design and operation of the conveyor 48, it will be noted that the coil springs 77 of the conveyor supporting assemblies 52 exert a force on the conveyor trough 49 in one direction only. The springs 77, therefore, function principally to balance the gravity components of the forces acting on the trough 49 and the material therein. In other words, when the drive arm 80 is actuated to effect movement of the trough 49 in a downwardly inclined direction to the lowermost end point of an oscillatory stroke, the weight of the trough and material is acting in a direction to assist the movement of the trough and the increased compression in the springs exerts a balancing force in a direction to resist the movement of the trough. On the other hand, when the trough 49 and material therein are moved in an upwardly inclined direction toward the uppermost end of an oscillatory stroke, the weight of the trough and material acts in a direction to resist the movement of the trough and the springs 77 exert a balancing force in a direction to assist the movement of the trough. The inertia forces developed by the oscillations of the trough 49 and material therein, therefore, must be substantially entirely balanced by the two reactor assemblies 81.

The inertia forces developed by the oscillating trough 49 and material therein may be calculated in the same manner as was previously described in connection with the conveyor 11. The total inertia force is then divided by two to determine the reactive force which each of the two reactor units 81 must supply and the size of the weights 82 and spring constants of the springs 99 and 100 of the reactor spring assemblies 84 may then be calculated using the same formulas as were used in connection with the design of the reactor units 22, previously described.

When the drive motor 55 is set into operation to actuate the drive arm 80 and impart oscillatory movement to the trough 49, and during the initial portion of the starting period when the frequency of oscillation of the trough is increased from zero to its normal operating frequency, the inertia forces developed by the trough 49 and the material therein will remain at a very low value compared to the forces developed by the trough and material when the trough is operated at its normal frequency. During this initial portion of the starting period, the weights 82 will move with the trough 49 and there will be substantially no reactive forces to be overcome by the drive arm 80. When the oscillations of the trough 49 have been increased to their normal operating frequency, however, the lower natural frequencies of the spring-mass systems of the reactor units 81 will cause the weights 82 to oscillate with a phase difference of approximately 180° from that of the trough 49 and the large inertia forces developed by the trough and the material therein will be balanced by the inertia forces developed by the weights 82. The forces applied to the conveyor trough 49 by the drive arm 80 are thereby maintained at a minimum value both during the starting and during the normal operation of the conveyor 48.

Because the weights 82 move in directions substantially normal to the axes of their supporting arms 83, transmission of the inertia forces absorbed by the springs 99 and 100 to the base sections 51 is substantially eliminated.

It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, I claim:

1. A device of the type described, comprising a stationary base, a body mounted for oscillation on said base, drive means for oscillating said body, resilient coupling means mounted on said body, and means providing a mass connected to said body by said resilient coupling means for oscillation with the body when said drive means is actuated to initiate oscillation of the body and for oscillation in directions opposite to the directions of oscillation of the body when the latter is oscillated at its normal operating frequency.

2. A device of the type described, comprising a stationary base, a body mounted for oscillation on said base, drive means for oscillating said body, a weight mounted for oscillation on said base, and resilient means mounted on said body and coupling said weight to said body for oscillation therewith when said drive means is actuated to initiate oscillation of the body and for oscillation in directions opposite to the directions of oscillation of the body when the latter is oscillated at its normal operating frequency.

3. A device of the type described, comprising a stationary base, a body mounted for oscillation on said base, drive means for oscillating said body at a normal operating frequency, a weight mounted for oscillation on said base, and springs means mounted on said body and coupling said weight to said body, said weight and spring means providing a spring-mass system having a natural frequency below the normal operating frequency of the oscillating body.

4. A device of the type described, comprising a stationary base, a body mounted for oscillation on said base, drive means for oscillating said body at a normal operating frequency, a weight mounted for oscillation on said base, and a plurality of springs mounted on said body and coupling said weight to said body, said springs urging said weight into a given position relative to said body and permitting oscillation of the weight relative to said base, said weight and said springs providing a spring-mass system having a natural frequency below said normal operating frequency to cause said weight to oscillate with the body when the latter is oscillated at a low starting frequency and in opposed relationship with the body after the frequency of oscillation of the latter has increased to said normal operating frequency, said springs being compressed by the opposed oscillations of said weight and said body.

5. A device of the type described, comprising a stationary base, a body, means mounting said body on said base for oscillation through an arcuate path, drive means for oscillating said body at a normal operating frequency, a weight, means mounting said weight on said base for oscillation through an arcuate path paralleling the path of said body, and a plurality of springs mounted on said body and coupling the weight to the body to cause the weight to oscillate with the body when the latter is oscillated at a low starting frequency, said weight and said springs providing a spring-mass system having a natural frequency below said normal operating frequency to cause the weight to oscillate at a lesser amplitude than said body and with a phase difference of substantially 180° from the oscillations of the body when the latter is oscillated at said normal operating frequency.

6. A device of the type described, comprising a stationary base, a body, a plurality of inclined, parallel supporting members pivotally connected to said body and said base to support the body for oscillation through an arcuate path, drive means for oscillating said body at a normal operating frequency, a weight, a plurality of inclined, parallel members supporting said weight on said base for oscillation through an arcuate path, bracket means mounted on said body, and a plurality of springs carried by said bracket means for resiliently connecting the bracket means and said weight to urge the latter into a position at which the weight supporting members and the body supporting members are in parallel relationship, said weight and said springs providing a spring-mass system having a natural frequency below the normal operating frequency of the oscillating body.

7. A device of the type described, comprising a stationary base, a body, a plurality of inclined, parallel supporting members pivotally connected to said body and said base to support the body for oscillation through an arcuate path, drive means for oscillating said body at a normal operating frequency, a weight, a plurality of inclined parallel members supporting said weight on said base for oscillation through an arcuate path, bracket means mounted on said body and providing spaced surfaces arranged in substantially parallel relationship with the supporting members for said body when the body is centered in its arcuate path of movement, connecting means secured to said weight and positioned between said parallel surfaces, and a spring positioned between each of said spaced parallel surfaces and the associated connecting means for resiliently coupling the weight with the body, said weight having a preselected mass and said springs having a preselected strength to provide a spring-mass system having a natural frequency below the normal operating frequency of the oscillating body.

8. A device of the type described, comprising a stationary base, a body mounted for oscillation on said base, drive means for oscillating said body, a plate mounted for oscillation on said base, a weight mounted on said plate, bracket means mounted on said body for movement therewith, and resilient means carried by said bracket means and connected to said plate to cause the latter to be oscillated by the oscillations of said body, said weight and plate and said resilient means providing a spring-mass system having a natural frequency below the normal operating frequency of the oscillating body to cause the oscillations of the body and the plate to have a phase difference of substantially 180° at said normal operating frequency.

9. A device of the type described, comprising a stationary base, a body mounted for oscillation on said base, drive means for oscillating said body, a weight, a pair of laterally spaced arms rigidly connected to said weight and pivotally connected to said base to support the weight for oscillation on said base, bracket means mounted on said body for movement therewith, resilient means carried by said bracket means, and means connecting said resilient means to said weight to cause the latter to be oscillated by the oscillations of said body, said weight and said resilient means providing a spring-mass system having a natural frequency below the normal operating frequency of the oscillating body to cause the phase difference between the oscillations of said weight and said body to increase from 0° to substantially 180° when the body is set into motion and its frequency of oscillation is increased to its normal operating frequency.

10. A device of the type described, comprising a stationary base, a body mounted for oscillation on said base, drive means for oscillating said body, a plate mounted for oscillation on said base, a plurality of weights detachably mounted on said plate, bracket means mounted on said body for oscillation therewith, and a plurality of springs carried by said bracket means and compressed against opposite sides of said plate to cause oscillatory movement of the latter when said body is oscillated, the size and number of said weights being selected to cooperate with said springs for providing a spring-mass system having a natural frequency below the normal operating frequency of the oscillating body to cause the oscillations of the plate and body to have a phase difference of substantially 180° at said normal operating frequency, the inertia forces developed by said weights and plate and by said body acting in opposite directions to alternately compress the springs on opposite sides of said plate.

11. A device of the type described, comprising a stationary base, an elongated body mounted for oscillation on said base, drive means for oscillating said body, an elongated weight, means pivotally connected to said base and said weight to support the latter for oscillation on said base, bracket means mounted at longitudinally spaced points on said body for movement therewith, resilient means carried by said bracket means, and means connecting said resilient means to longitudinally spaced points on said weight to cause the latter to be oscillated by the oscillations of said body, said weight and said resilient means providing a spring-mass system having a natural frequency below the normal operating frequency of the oscillating body to cause the phase difference between the oscillations of said weight and said body to increase from 0° to substantially 180° when the body is set into motion and its frequency of oscillation is increased to its normal operating frequency.

12. A device of the type described, comprising a stationary base, an elongated body mounted for oscillation on said base, drive means for oscillating said body, an elongated weight, a plurality of longitudinally spaced arms pivotally connected to opposite sides of said weight and to said base to support the weight for oscillation on said base, a plurality of brackets mounted at longitudinally spaced points on said body for oscillation therewith, resilient means carried by said brackets, and means connecting said resilient means to longitudinally spaced points on said weight to cause the latter to be oscillated by the oscillations of said body, said weight and said resilient means providing a spring-mass system having a natural frequency below the normal operating frequency of the oscillating body to cause the oscillations of the body and weight to have a phase difference of substantially 180° at said normal operating frequency.

13. A device of the type described, comprising a stationary base, an elongated body mounted for oscillation on said base, drive means for oscillating said body, an elongated weight, a plurality of longitudinally spaced arms pivotally connected to opposite sides of said weight and to said base to support the weight for oscillation on said base, a plurality of brackets mounted at longitudinally spaced points along opposite side portions of said body for movement therewith and providing spaced opposed spring seats, a plurality of plates mounted on said weight and extending laterally outwardly from opposite sides thereof into positions between said opposed spring seats, and a plurality of springs compressed between said spring seats and opposite sides of said plates to cause the weight to be oscillated by the oscillations of said body, said weight and said springs providing a spring-mass system having a natural frequency below the normal operating frequency of the oscillating body to cause the oscillations of the body and weight to have a phase difference of substantially 180° at said normal operating frequency.

14. A device of the type described, comprising a stationary base, an elongated body mounted for oscillation on said base, drive means for oscillating said body, an elongated weight, a plurality of longitudinally spaced pairs of arms pivotally connected to opposite sides of said weight and to said base to support the weight for oscillation on said base, a plurality of longitudinally spaced pairs of brackets mounted along opposite side portions of said body for movement therewith, each of said brackets providing a pair of spaced parallel spring seats positioned laterally outwardly of the adjacent side of said weight, a plurality of plates mounted on said weight and extending laterally outwardly therefrom, each of said plates being positioned between and in parallel relationship with an associated pair of said spring seats, and a pair of axially aligned coil springs compressed between each pair of spring seats and the opposite sides of the associated plate to cause the weight to be oscillated by the oscillations of said body, said weight and said springs providing a spring-mass system having a natural frequency below the normal operating frequency of the oscillating body to cause the oscillations of the body and weight to have a phase difference of substantially 180° at said normal operating frequency.

References Cited in the file of this patent

UNITED STATES PATENTS

| | | |
|---|---|---|
| 2,243,936 | Wurzbach et al. | June 3, 1941 |
| 2,684,754 | Bankauf et al. | July 27, 1954 |